Patented Jan. 1, 1952

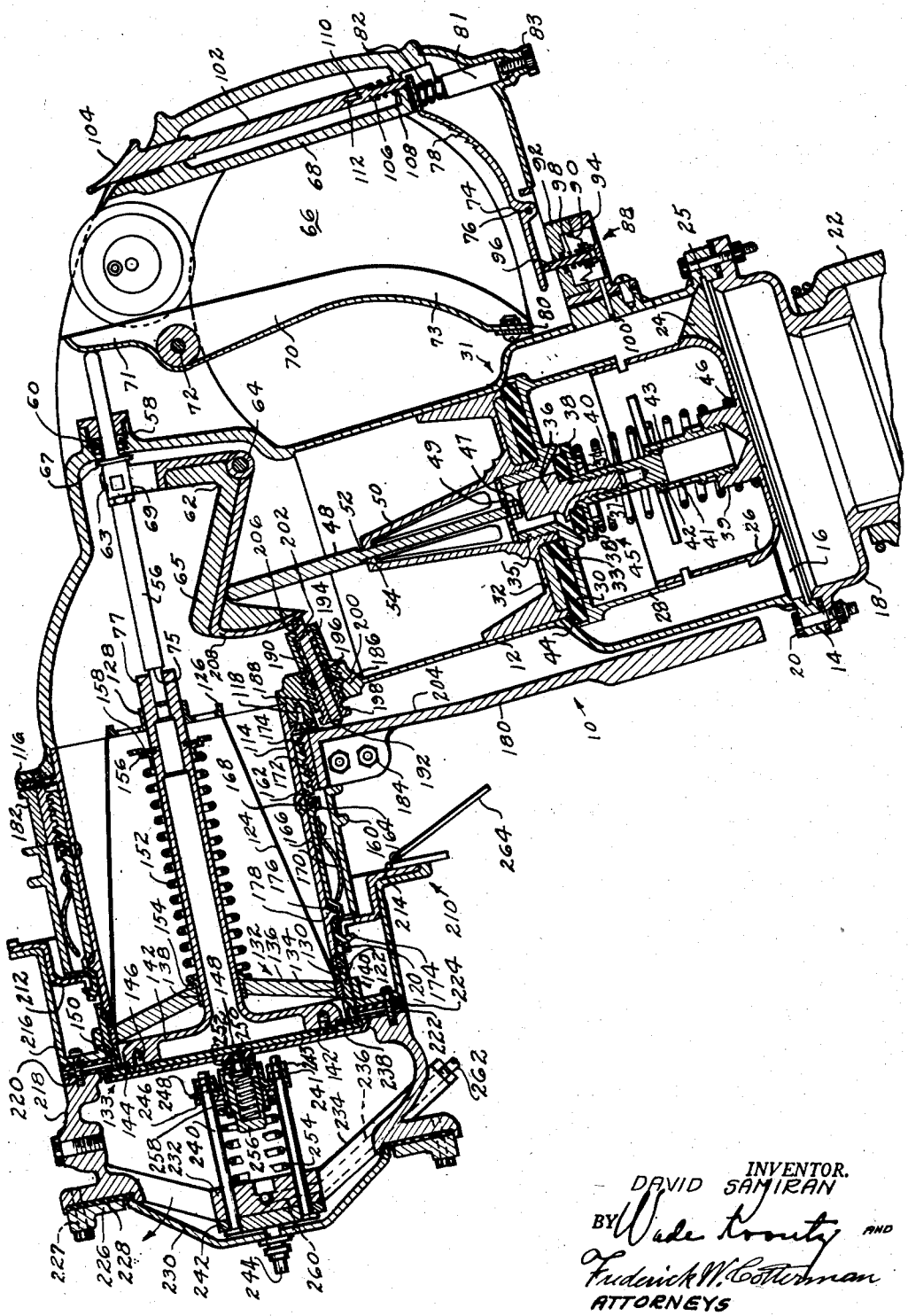

2,580,466

UNITED STATES PATENT OFFICE 2,580,466

FUEL SERVICING NOZZLE

David Samiran, Dayton, Ohio

Application December 17, 1948, Serial No. 65,951

4 Claims. (Cl. 226—127)

(Granted under the act of March 3, 1883, as amended April 30, 1928; 370 O. G. 757)

The invention described herein may be manufactured and used by or for the Government for governmental purposes without payment to me of any royalty thereon.

This invention relates to a fuel servicing nozzle and is particularly applicable in filling the fuel tanks of aircraft.

An object of the invention is to provide a novel nozzle which will be carried on the end of the servicing hose of a fuel supply truck or other fuel supply vehicle for attachment to a fuel tank or to a manifold through which a plurality of tanks may be serviced.

Another object is to provide means for manually opening the nozzle and locking it in the open position together with means for automatically releasing the locking means, the automatic releasing means being responsive to resistance to further fuel inflow into the tank or tanks being filled.

Another object is to provide, in a nozzle of this kind, means for securely joining the nozzle outlet to the fuel intake fitting on an aircraft tank or on a manifold which is connected to service a plurality of tanks, together with means operative automatically to prevent manual opening of the nozzle unless and until said joining means has been made fully effective, and conversely to prevent releasing said joining means unless and until flow through said nozzle has been shut off.

Another object of the invention is to so construct and arrange the valving therein that before the nozzle may be disconnected from the fuel intake fitting through which the tank or tanks are being serviced, the outlet end of the nozzle is completely closed, whereby any fuel remaining in the nozzle will be sealed therein against waste by leakage.

Another object is to provide for the valving within my nozzle a dashpot means whereby the closing of the several valves will be retarded to the end that more quiet operation will be had.

Other objects and advantages will appear as the invention is more specifically defined in the specification and claims and in the drawings wherein a single figure of the drawing represents a preferred form of my invention.

The pistol grip nozzle 10 herein shown to illustrate an embodiment of my invention is similar to that shown and described in my copending application Serial No. 546,728 filed July 26, 1944, now abandoned, or like that in my copending application Serial No. 30,713, filed June 2, 1948, now Patent Number 2,556,221, except for several improvements which are nevertheless important as will hereafter appear.

In the drawing, the pistol grip nozzle 10 has a housing 12 with a flange 14 by which the inflow opening 16 of the valve is connected to a hose fitting 18 by bolts 20, the other end of the hose 22 being connected to and carried on a refuelling vehicle. Spokes 24 held in the housing 12 by a snap ring 25 support a piston 26 over which a dashpot 28 is slidable.

The dashpot 28 carries a resilient valve disc 30 of synthetic rubber or the like held in place on a dashpot by an axially slidable clamping member 32, the hub 33 of which is in threaded engagement with the hub 35 of the dashpot 28. The valve-comprising parts 30, 32, 33, etc. constitute a valve which may be broadly designated by the numeral 31.

A smaller resilient disc 34 is held between a shoulder 37 on the valve guide 36 and a clamping disc 38 which has a long hub 40 extending axially and which is in threaded engagement with the end of the valve guide 36 whereby the disc 34 may be clamped. The hub 40 is enlarged at the end as at 42, the enlarged portion having limited axial movement in a tubular guide sleeve 41 which is threadedly held in the hub 39 of the piston 26. The guide sleeve 41 is flanged inward at the end to provide a shoulder 43 whereby axial movement of the enlarged end 42 may be selectively limited. The valve-comprising parts 34, 36, 38, 40, etc. constitute a valve which may be broadly designated by the numeral 45.

The larger resilient disc 30 normally has seating engagement at 44 with the housing 12 whereas the smaller resilient disc 34 normally has seating engagement with the hub of the dashpot 28. A coil spring 46 reacting against the piston 26 urges the smaller resilient disc 34 onto its seat in the hub of the dashpot 28 which in turn urges the larger valve disc 30 onto its seat in the housing 12.

A push rod 48 for raising the valve discs 30 and 34 off their seats has bearing in the outer end of a hollow conical hub 50 which projects from the clamping member 32. A space 52 is left between a shoulder 54 on the rod and the end of the hub 50, space 52 being adjustable by nuts 47 abutting a plate 49. Because of the space 52 between the shoulder 54 and the end of the hub 50, the smaller resilient disc 34 will be raised slightly off its seat before the larger resilient disc 30 will be raised off its seat, thereby lessening the effort required to open the larger valve.

A relatively long valve opening rod 56 has sliding bearing in a hub 58 in the outer wall of the housing 12, a packing 60 being provided to prevent leakage at this point. A bell crank 62 having a power arm 63 and work arm 65 is pivoted in the housing 12 at 64, the power arm 63 being acted upon by the flange 67 of an adjusting nut 69 which has threaded bearing on the rod 56. When the nut 69 is properly adjusted, the one end of the valve-opening rod 56 should rest on the short arm 71 of the trigger 70. The other end of the valve-opening rod 56 is reduced in diameter to provide a shoulder 75 which is slightly removed from the end of the valve stem 77 within which the reduced end of the rod 56 is slidable.

A hand grip mechanism 66 having a framework 68 integral with or attached to the housing 12 is provided to facilitate operation of the nozzle. A trigger 70 is hinged on the hand grip 66 at 72 whereby pressing down the long arm 73 of the trigger operates the valve opening rod 56, which in turn, by way of the bell crank 62, operates the push rod 48. A ratchet-like lever 74 is hinged on the handgrip 66 at 76, this lever having ratchet teeth 78 which a pawl 80, on the end of the trigger 70 may engage. A coil spring 82 adjustable by screw 81 and lock nut 83 urges the teeth 78 into engagement with the pawl 80 when the long arm 73 of the trigger 70 is drawn outward.

A trigger release mechanism 88 consists of a diaphragm 90 in a two-part casing 92, 94 the diaphragm having an operating rod 96 centrally positioned in, and secured to, the diaphragm. A coil spring 98 biases the diaphragm to the unoperated position. A small hole 100 is provided for admitting a fluid under pressure to the outer surface of the diaphragm whereby movement of the operating rod 96, acting through the ratchet lever 74, releases the ratchet teeth 78 from the pawl 80 and thereby allows the valve discs 30 and 34 to seat.

Means is also associated with the trigger release mechanism for tripping the release mechanism manually. It consists of a trip bar 102 having bearings at each end in the framework 68 for sliding movement endwise with the bar, with a thumbpiece 104 at one end of the bar. The other end of the trip bar 102 is reduced in diameter to provide a shoulder 106 against which a spring 108 bears to urge the bar axially. A pin 110 extends through the framework 68 and through a slot 112 in the trip bar 102 to limit its axial movement, whereby the swinging of the ratchet lever 74 is arrested in a proper position to hold the teeth 78 where they may be engaged by the pawl 80, whereby, if the thumbpiece 104 is depressed when the pawl 80 and ratchet teeth 78 are engaged, the teeth will be withdrawn from the pawl and the valve dics 30 and 34 will seat.

Extending laterally from one side of the main housing 12 is a housing extension 114 which has a flange 116 by which it is held to the main housing by screws 118. At the outer end, the housing extension 114 is externally threaded as at 120 to receive the internally threaded valve seat ring 122. A conical screen 124 is reinforced at the small end by a disc 126 which has a hub 128 slidably fitted over the valve stem 77, the large end of the screen being reinforced by a ring 130.

A spider 132 comprises a ring 134 with inwardly extending legs 136 which support a concentric hub 138 within which the valve stem 77 is slidable. The spider ring 134 and screen ring 130 are of equal outside diameter and the valve seat ring 122 is internally bored to a shoulder 140 to receive the rings 134 and 130, whereby, when the valve seat ring 122 is screwed over the externally threaded end 120 of the housing extension 114, the spider ring 134 and screen ring 130 will be clamped together and to the end of the housing extension 114 by the shoulder 140.

On the outer end of the valve stem 77 is a valve head 142 to which a washer 144 of resilient material, such as synthetic rubber or the like, is fastened by screws 146 which extend through a metal plate 148 into the valve head 142 to clamp the resilient washer 144. The end of the valve seat ring 122 has an annular groove 150 thereby narrowing the seat which the resilient washer 144 may engage.

Parts 122, 132, 142, etc. constitute a valve which may be broadly designated by the numeral 133.

A coil spring 152 is held in compression at one end by a flange 154 on the hub 138 and at the other end by a flanged member 156 held on the valve stem 77 by a split washer 158, whereby the valve head 142 is normally drawn inward to press the resilient washer 144 against the end of the valve seat ring 122.

Surrounding the housing extension 114 is a cover member 160 which is concentrically spaced from the housing extension by ribs (not shown) the cover member being held against rotation about the axis by set screws in the ribs. Between pairs of the ribs, segments 162 are slidable axially. Segments 162 have ears 164 at the ends between which locking arms 166 are hinged by pins 168. Leaf springs 170 urge the locking arms 166 inward to the unlocked position shown.

Concentrically surrounding the segments 162 is a ring 172 which is externally serrated and provided internally with a coarse pitch thread 174 into which corresponding threads on the segments 162 extend, whereby rotation of the ring 172 moves the segments 162 and their locking arms 166 axially.

On the swingable end of the locking arm 166 is a hook 174, and adjacent each hook 174 is a beveled notch 176 which lies over a beveled lug 178 formed on the outside surface of the housing extension 114, whereby when the segments 162 draw the locking arms 166 axially, the hooks 174 move both axially and outwardly away from the axis into clamping position.

A handle 180 extends radially from an internally serrated split collar 182 which surrounds the externally serrated and internally threaded ring 172. Bolts 184 are provided to clamp the split collar 182 to the ring 172 when, with the hooks 174 fully drawn up, the handle is adjusted so as to stop movement in the desired position.

A hub 186 in the wall of the main housing 12 is pipe threaded at 188 to receive a sleeve 190. Sleeve 190 is bored at one end to slidably fit the locking pin 192, counterbored for a coil spring 194, again counterbored for a packing gland 196, and tapped at the other end for the packing nut 198 which is provided for holding the packing 200. The spring 194 acts against a flange 202 on the locking pin 192 to hold the locking pin in the position shown.

One end of the locking pin 192 abuts a plane surface 204 on the side of the handle 180 while the other end rests in a pocket 206 in a cam 208 which extends integrally from the work arm 65 of the bell crank 62. Obviously as long as the locking pin is restrained against movement by the surface 204, the bell crank 62 cannot operate and the several valves must remain locked in the closed position shown.

The surface 204 on the side of the handle 180, however, extends only through approximately ninety degrees of rotation, so that, when the handle is turned through a ninety degree angle, which is the angular movement required to draw the hooks 174 into clamping position, the edge of the surface 204 passes off the end of the locking pin 192 so that thereafter the trigger 70 may be depressed and the several valves thereby opened. It follows that as long as the valves are open the locking pin prevents movement of the handle 180 whereby detachment of the nozzle is prevented.

As a connecting means through which the outflow end of the nozzle may be joined to a tank or to a manifold for servicing a plurality of tanks, a fuel intake fitting 210 is provided and installed at a convenient place in the skin of the aircraft and has permanent connection with the manifold or tank, connection with a manifold being shown.

The fuel intake fitting 210 comprises a flanged saucer-like member 212 concentrically positioned over an opening 214 in the side of the fuselage. The inner periphery of the saucer 212 is slotted to receive and support the ends of the hooks 174. A flanged cup 216 surrounds the member 212 and is also concentrically positioned over the opening 214 and fastened in the side of the fuselage. A hollow casting 218 is fastened by screws 220 to the inner end of the member 213, two resilient washers 222 with a metal ring 224 of T shaped cross section being clamped between the hollow casting and the end of the member 212. The other side of the hollow casting 218 is secured to one joint of a manifold 226 by screws 227, a gasket 228 being interposed between the hollow casting and the manifold, the gasket serving also as a seat for the valve head 230. A hub 232 is an integral part of the hollow casting 218 and is supported on arms 234 one of which is drilled as at 236 for a purpose which will later appear.

Within the hollow casting 218 is a valve head 238 which normally is seated on the resilient washer 222. Two axially parallel bolts 240 are slidable through openings in the hub 232 but are fixed against axial movement with respect to the valve head 230 by reason of the heads of the bolts 240 being clamped between the valve head 230 and a washer 242 by the small bolt 244.

At the threaded ends, each of the bolts 240 has a nut 241 and jam nut 243. Two flanged cups 246 and 248 have their flanges provided with holes within which the bolts 240 are slidable. A small stud 250 is fastened by a pin 252 to the valve head 238, the head of the stud securing the flanged cup 248 to the valve head. The other flanged cup 246 is held against the flanged cup 248 by a relatively heavy coil spring 254. The bottom of the flanged cup 246 has an opening to slidably receive the small valve member 256, the small valve member having an enlarged portion which limits its axial movement in the cup 246. A light spring 258 urges the small valve member 256 toward its seat 260.

In the drawing the nozzle is shown in its closed or unoperated state. Attaching the nozzle to an aircraft to be serviced and opening it for the passage of fuel into the tanks may preferably be accomplished substantially as follows:

The discharge end of the nozzle is inserted into the fuel intake fitting 210 and the handle 180 is turned through approximately ninety degrees rotation which causes the hooks 174 to move both outward and axially and thereby clamp the nozzle to the member 212 of the fuel intake fitting.

Since turning the handle 180 through ninety degrees rotation carries the edge of the surface 204 of the handle beyond the end of the locking pin 192, the trigger 70 may now be drawn back until the pawl 80 engages one of the notches 78 whereby valves 31 and 45 will be opened by the push rod 48, and valve 133 will be opened by the valve opening rod 53. The opening of the valve 133 raises the valve head 238 off its seat on the resilient washer 222 and, through the bolts 240, raises the valve head 230 off its seat on the resilient washer 228, thereby clearing the path for fuel flow through the fuel intake fitting 210, at the same time closing the vent passageway 260 and 236 by engagement of the small valve 256 with the opening 260.

Aircraft tanks of a capacity for which the herein described nozzle is adapted usually each has a means for preventing further inflow of fuel when the fuel in the tanks reaches a predetermined level, whereby, when all tanks have been filled, pressure will build up in the trigger release 88 and operate the ratchet lever 74 and thereby cause the valves 31, 45 and 133 to be closed, the valve heads 230 and 238 to return to their seats and the small valve 256 to be opened. The dashpot 28 and piston 26 prevent too rapid closing of the valves.

When the valves 31, 45 and 133 are closed, any fuel remaining in the nozzle will be retained therein without leakage, and any fuel remaining in the fuel intake fitting 210 will be held therein between valve heads 230 and 238, the pressure being relieved through the passageway 260 and 236. A small conduit 262 may preferably be provided and connected to the opening 236 and carried to the top of one of the fuel tanks of the system in order that any leakage from the manifold past the valve head 230 will be returned to a tank. A flush cover 264 is hinged to the edge of the opening 214 for closing the opening when the servicing is completed and the nozzle has been removed.

Having described a preferred embodiment of my invention, I claim:

1. An improved fuel servicing nozzle comprising, in combination, a nozzle housing, normally closed valve means within said housing for preventing fluid flow therethrough, manually operable linkage for opening said valve means, nozzle attaching means at the discharge end of said nozzle for connecting said discharge end to a receptacle to be serviced, a lever pivotally carried by said housing for operating said nozzle attaching means, a locking pin having sliding bearing in said housing and having one end normally seated in a pocket in a member of said linkage to prevent operation of said linkage to open said valve means, and said lever having a portion normally abutting the other end of said locking pin to maintain the said one end seated in said pocket, said portion being adapted to be withdrawn from the said other end by operation of said lever to effectuate nozzle connection, whereby nozzle connection must be effectuated before said valves may be opened.

2. An improved fuel servicing nozzle comprising, in combination, a nozzle housing, normally closed valve means within said nozzle housing, one at the discharge end and one near the inlet end, spring means within said housing positioned to urge said valve means to closed position, latch means movably mounted within said housing for holding said valve means in open position, pressure actuated means actuated by built-up fuel pressure of incoming fuel upstream of the inlet valve associated with said latch means for releasing said latch means and thereby allowing said springs to close said valves, and dashpot means carried on said valve means for retarding the valve means in closing.

3. An improved servicing nozzle comprising, in combination, a nozzle housing, a normally closed fuel discharge valve at the discharge end of said housing, manually operable linkage for opening said fuel discharge valve, nozzle attaching means at the discharge end of said housing for connecting said discharge end to a receptacle to be serviced, means normally connecting said receptacle to atmosphere, and means operable by opening of said discharge valve for disconnecting said receptacle from atmosphere.

4. In a servicing nozzle, the combination of a housing, normally closed valve means within said housing adapted for preventing fuel flow therethrough, manually operable linkage for opening said valve means, manually operable nozzle attaching means movably carried on said housing adapted for connecting said nozzle to a receptacle to be serviced, manual means for operating said nozzle attaching means, a latching means carried by said housing having a portion normally seated in a pocket in a member of said linkage to prevent operation of said linkage to open said valve means, and said manual means having a portion normally abutting said latching means to maintain said latching means seated in said pocket, said portion being adapted to be withdrawn from contact with said latching means by operation of said manual means, to permit operation of said manual means, whereby said linkage may be operated and said valve means thereby opened.

DAVID SAMIRAN.

REFERENCES CITED

The following references are of record in the file of this patent:

UNITED STATES PATENTS

| Number | Name | Date |
|---|---|---|
| 1,550,738 | Payne | Aug. 25, 1925 |
| 1,725,826 | Payne | Aug. 27, 1929 |
| 1,998,221 | Conklin | Apr. 16, 1935 |
| 2,083,078 | Mayo | June 8, 1937 |
| 2,363,123 | Franck | Nov. 21, 1944 |
| 2,367,138 | Payne | Jan. 9, 1945 |
| 2,388,852 | Killman | Nov. 13, 1945 |
| 2,420,341 | Samiran | May 13, 1947 |
| 2,461,312 | Dahlem | Feb. 8, 1949 |
| 2,508,626 | Snyder | May 23, 1950 |
| 2,519,358 | Davies | Aug. 22, 1950 |